United States Patent [19]
Nielsen

[11] Patent Number: 5,930,263
[45] Date of Patent: Jul. 27, 1999

[54] DATA TRANSMISSION SYSTEM FOR THE TRANSMISSION OF A LARGE NUMBER OF TELEPHONE CHANNELS AND A METHOD IN CONNECTION THEREWITH

[75] Inventor: Anders B. Nielsen, Skovlunde, Denmark

[73] Assignee: DSC Communications A/S, BALLerup, Denmark

[21] Appl. No.: 08/755,173

[22] Filed: Nov. 25, 1996

[30] Foreign Application Priority Data

Nov. 24, 1995 [DK] Denmark .................................. 1333/95

[51] Int. Cl.⁶ ....................................................... H03J 3/07
[52] U.S. Cl. ............................ 370/465; 370/505; 370/528; 370/907
[58] Field of Search ........................................ 370/397, 399, 370/409, 474, 476, 503, 505, 506, 528, 465, 907

[56] References Cited

U.S. PATENT DOCUMENTS

| | | | |
|---|---|---|---|
| 4,964,122 | 10/1990 | Ferguson et al. | 370/102 |
| 5,265,096 | 11/1993 | Parruck. | |
| 5,282,195 | 1/1994 | Hood et al. | 370/58.1 |
| 5,416,768 | 5/1995 | Jahromi | 370/360 |
| 5,471,511 | 11/1995 | De Langhe et al. | 375/371 |
| 5,544,172 | 8/1996 | Abbas | 370/505 |
| 5,650,825 | 7/1997 | Naimpally et al. | 370/528 |

FOREIGN PATENT DOCUMENTS

| | | | |
|---|---|---|---|
| 2260469 | 4/1993 | United Kingdom | H04J 3/07 |
| 9422249 | 9/1994 | WIPO | H04L 12/48 |
| 9515042 | 6/1995 | WIPO | H04L 7/00 |

*Primary Examiner*—Douglas W. Olms
*Assistant Examiner*—Seema S. Rao
*Attorney, Agent, or Firm*—Baker & Botts, L.L.P.

[57] ABSTRACT

A data transmission system is used for the transmission of a large number of telephone channels between nodes in a transmission network built as a Synchronous Digital Hierarchy (SDH), where a pulse frame (e.g. STM-1) contains a large number of bytes, each of which can be used for the transmission of a telephone channel or of overhead signals for the administration of the system, and where signals from a Plesiochronous Digital Hierarchy (PDH) are introduced into the pulse frame of the Synchronous Digital Hierarchy, so that the signals from the Plesiochronous Digital Hierarchy when introduced do not occupy all the bytes in said pulse frame. At least some of the bytes of the pulse frame which are not occupied by introduction, are used for the transmission of user-specified data signals.

10 Claims, 2 Drawing Sheets

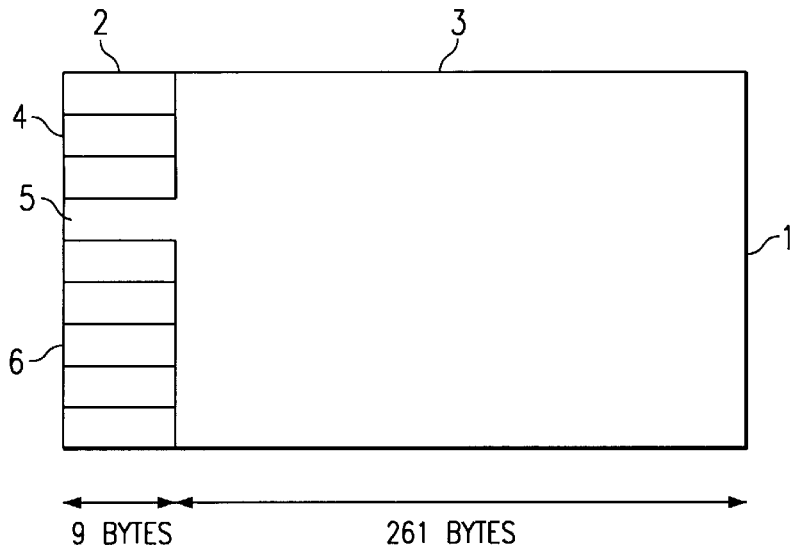
FIG. 1
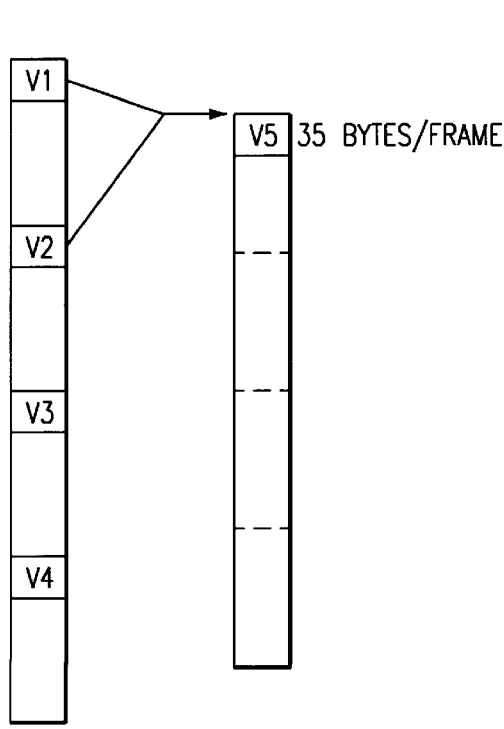
FIG. 4
| 1 | V5 |
| 2 | R |
| 3 1 ... 34 | 32 BYTES(32*81) |
| 35 | R |
| 36 | J2*) |
| 37 | C1C20000RR |
| 38 1 ... 69 | 32 BYTES(32*81) |
| 70 | R |
| 71 | Z6*) |
| 72 | C1C20000RR |
| 73 1 ... 104 | 32 BYTES(32*81) |
| 105 | R |
| 106 | Z7*) |
| 107 | C1C2RRRRRS1 |
| 108 | S2 IIIIIII |
| 109 1 ... 139 | 31 BYTES(31*81) |
| 140 | R |
FIG. 5

DATA TRANSMISSION SYSTEM FOR THE TRANSMISSION OF A LARGE NUMBER OF TELEPHONE CHANNELS AND A METHOD IN CONNECTION THEREWITH

TECHNICAL FIELD OF THE INVENTION

The invention concerns a data transmission system for the transmission of user-specified data signals in a transmission network designed as a Synchronous Digital Hierarchy (SDH). A pulse frame (e.g. STM-1) contains a large number of bytes, each of which is used for transmitting a telephone channel or overhead signals for administering the system, and signals from a Plesiochronous Digital Hierarchy (PDH) are inserted into the pulse frame for the Synchronous Digital Hierarchy, so that the signals from the Plesiochronous Digital Hierarchy when inserted do not occupy all the bytes in said pulse frame.

The invention moreover concerns a method of transmitting user-specified data signals in such a transmission network.

RELATED PATENT APPLICATION

This application claims the benefit of Danish Patent Application Ser. No. 1333/95, filed on Nov. 24, 1995.

BACKGROUND OF THE INVENTION

The Synchronous Digital Hierarchy (SDH) is a very widely used transmission system for the transmission of a large number of telephone channels between nodes in a transmission network. The system permits transfer of asynchronous signals, such as e.g. signals from a Plesiochronous Digital Hierarchy (PDH) of 140, 34 and 2 Mbits/s, said signals being inserted or mapped into the SDH system. Standards prescribe how to place the individual signals in the individual bytes in the pulse frame of the SDH system.

Frequently, it is desirable to be able to transmit a user channel together the data proper (i.e. the telephone channels). It may e.g. be a monitoring channel for the equipment which is connected to a 2 Mbits/s section, it being desirable to transmit the channel together with the associated 2 Mbits/s signals. So far, this has just been possible by using overhead bytes, as e.g. the overhead bytes called D1–D12 in the SDH system may be used in certain situations for transferring user channels. However, these can just be used for transferring data between two adjacent elements in the network, as each element decides for itself what it wants to use them for, and in certain situations they are reserved in advance for other purposes. It is thus not possible to use these bytes when other network elements are passed en route. Furthermore, the capacity of these bytes is rather limited, so that only small amounts of data can be transferred in this way.

However, when the PDH signals are inserted into the pulse frame of the SDH system, they will not use all the bytes of the pulse frame because of the absent synchronization of the two systems. Thus, there is a plurality of empty bytes which are merely used as a filler between the bytes which contain PDH signals.

SUMMARY OF THE INVENTION

The object of the invention is to provide a data transmission system where one or more user channels may be transmitted together with the telephone channels in the SDH system without otherwise affecting the system or its transmission capacity, and without the information being lost in network elements which are passed en route.

This is achieved according to the invention in that at least some of the bytes in the pulse frame which are not occupied by said insertion, are used for the transmission of user-specified data signals.

In case of inserting e.g. PDH signals at 2 Mbits/s into a virtual container VC-12 in the Synchronous Digital Hierarchy, the user channel together with the telephone channels in the VC-12 may also be connected through equipment which is not adapted to transfer the user channel, if only the VC-12 is not "opened" en route. The function may be used e.g. for ensuring that a monitoring channel for equipment connected to a 2 Mbits/s section accompanies the associated telephone channels in the network. Further, this user channel/monitoring channel is easily accessed at the locations where the telephone channels are taken out of the system.

It may be expedient in this situation to place the user channels in one or more of the bytes which are called fill bytes or stuffing bytes (R) in this insertion.

A particularly expedient embodiment of the invention is obtained when the user channels are placed in byte No. 34 and/or byte No. 104 in the VC12 container, it being possible to transmit e.g. up to 7 user channels with 24 kbits/s.

As mentioned, the invention also concerns a method of transmitting user-specified data signals in such a transmission network. When the user-specified data signals are transmitted in one or more of the bytes in the pulse frame which are not occupied by said insertion, the abovementioned advantages are obtained.

BRIEF DESCRIPTION OF THE DRAWINGS

The invention will be described more fully below with reference to the drawings, in which:

FIG. 1 shows how an STM-1 frame in an SDH system is designed,

FIG. 4 shows the linkage of VC-12's from 4 successive VC4's, and FIG. 5 shows the structure of FIG. 4 in greater detail.

DETAILED DESCRIPTION OF THE INVENTION

Figure 2:
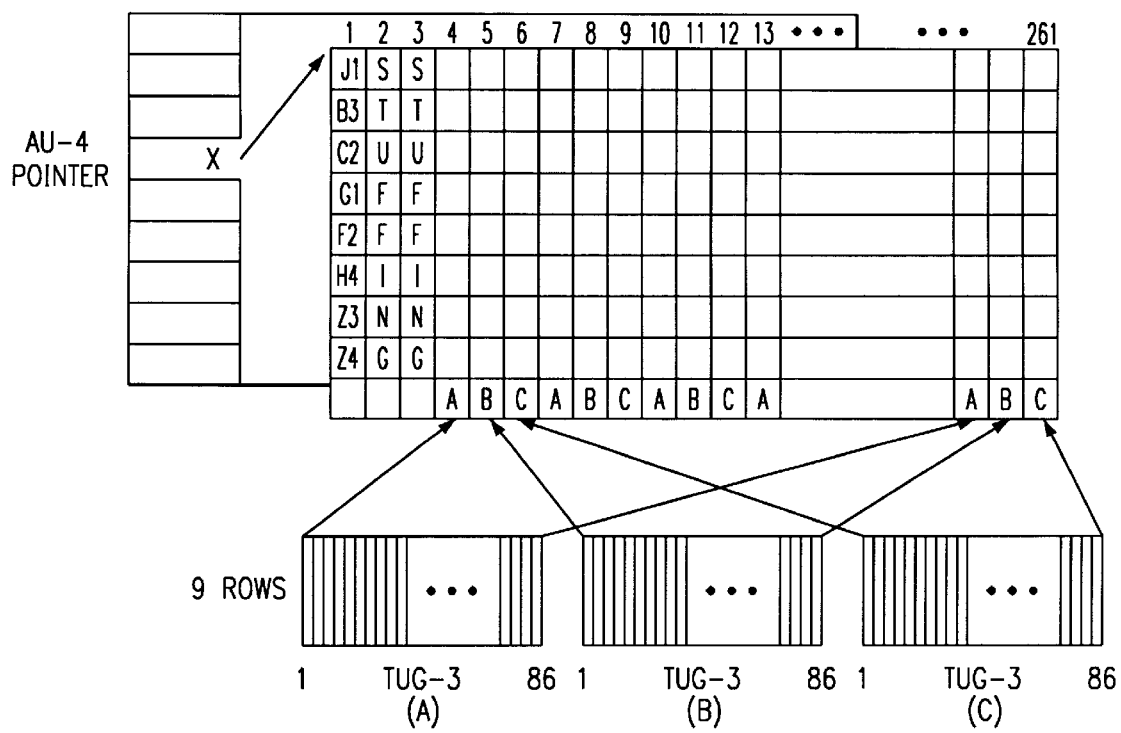
FIG. 2 shows how 3 TUG's are multiplexed into a VC-4.

A Synchronous Digital Hierarchy (SDH) is a digital transmission system which is used e.g. in connection with the transfer of a large number of telephone channels between nodes in a telecommunications network.

Like many other signals transmitted in a telecommunications network, SDH signals are a serial flow of logic 1's and 0's that may be divided into a sequence of bytes having 8 bits each. The signals are structured so that the transmitted bit flow may be subdivided into a plurality of channels for different applications. The basic structure of an SDH signal is a so-called Synchronous Transport Module at level 1 (STM-1), which is shown in FIG. 1, from which it appears that the STM-1 signal may be illustrated as a frame 1 having 9 rows and 270 bytes in each row. The signals are transmitted one row at a time with the uppermost row first, and each row is transmitted from the left to the right. Each byte is transmitted with the most significant bit first.

As appears from FIG. 1, the first 9 overhead bytes 2 in each row are used by the SDH system itself for overhead 4, 6 and pointers 5, respectively. The remaining 261 payload bytes 3 in each row constitute the transport capacity of the SDH system, but with part thereof being used also for overhead. The STM-1 frame is transmitted 8000 times per second, corresponding to a duration of 125 µs of each frame, and since each frame contains 9 rows each having 270 bytes of 8 bits each, the data rate is thus 155.520 Mbits/s. The 125 µs corresponds to the sampling time in a digital telephone channel. A telephone channel is digitized with 8 bits, and this means that each byte in an STM-1 signal may be a telephone channel.

The transport capacity of the 9 rows of 261 bytes each constitutes a so-called virtual container designated VC4. Frequently, the SDH system is used for transporting e.g. PDH signals, and in that case a VC-4 may contain a PDH channel of 140 Mbits/s, or it may be subdivided into a plurality of smaller virtual containers. It may contain 3 VC-3 each having a PDH channel of 34 Mbits/s or 63 VC-12 each having a PDH channel of 2 Mbits/s. An insertion structure, a so-called mapping, is defined for each of these signals, indicating how the signal is to fill the allocated location in the frame.

FIG. 2 thus shows how 3 VC-3 containers may be mapped into a VC-4. This is done by subdividing VC-4 into 3 units called TUG-3, each of which may contain a VC-3. As will be seen, the first three columns are used for overhead and stuffing bytes, while the 3 TUG-3 units are multiplexed into the remaining columns.

Figure 3:
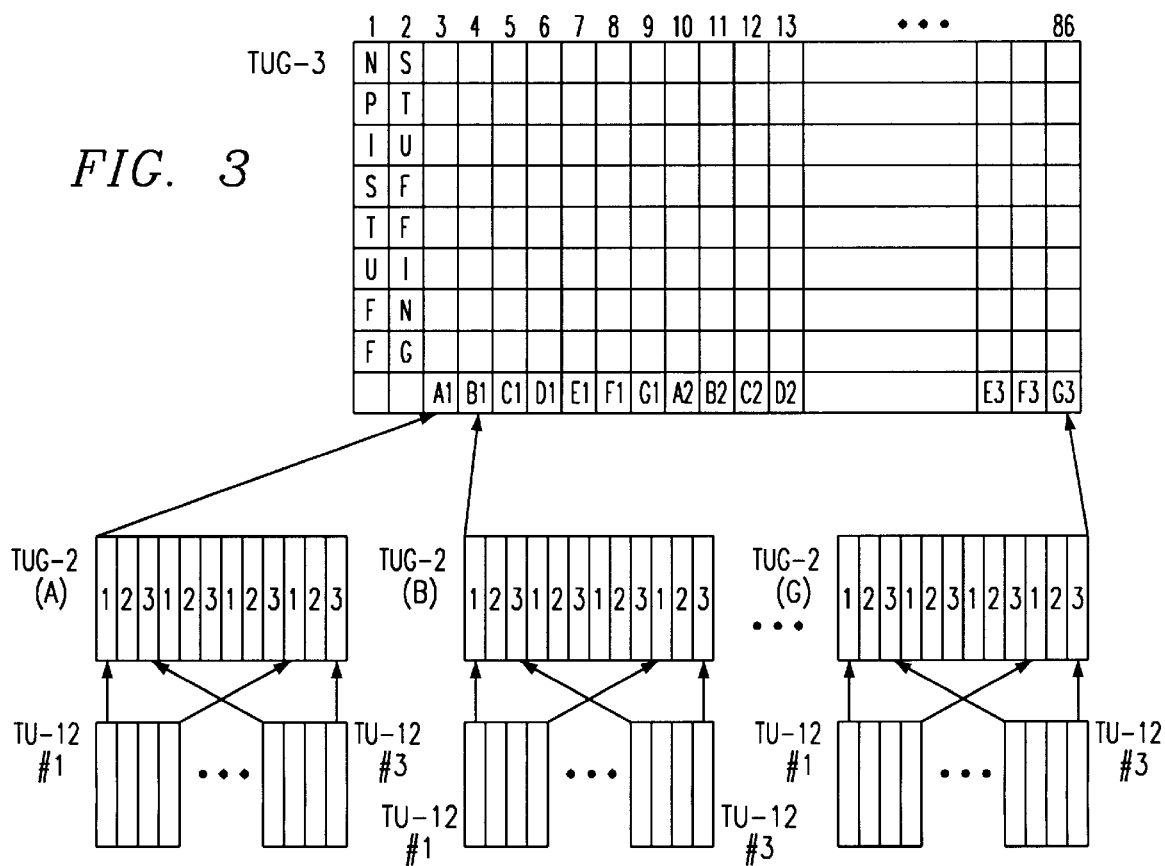
FIG. 3 shows how the TU-12's and the TUG-2's are multiplexed into a TUG-3.

If 2 Mbits/s channels are to be transferred, each TUG-3, instead of a VC-3, contains 7 TUG-2 units, each of which is in turn divided into 3 TU-12 units. FIG. 3 shows how the TU-12's and the TUG-2's are multiplexed into TUG-3. It also appears that each TU-12 consists of 4 columns of 9 bytes each in each SDH frame, i.e. a total of 36 bytes for each 125 µsec.

Thus, a VC-12 might be included in principle in each Th-12; but to utilize the space better for overhead information, the TU-12's (i.e. 36 bytes) are linked in 4 successive VC-4 containers in practice. Hereby, each byte intended for overhead may be used for various items of overhead information, but, then, each of these is transferred only in every fourth VC-4. This linkage is shown in FIG. 4.

This structure is shown more fully in FIG. 5. I represents the bits which are used for the information proper, i.e. the telephone channels. R represents bits which are introduced to make the bit number come right when mapping the 2 Mbits/s channel into the VC-12. These bits are called stuffing bits. If a whole byte exclusively consists of stuffing bits, the byte might be called a stuffing byte. The other designations are various items of overhead information.

According to the invention, some of the bytes exclusively consisting of stuffing bits are used for transmitting user channels. These may e.g. be the bytes which are designated by 10 and 11 in FIG. 5. In practice, 6 bits are used in each of the two bytes, the remaining two bits in each byte being used for parity comparison. It is hereby possible to transfer 7 user channels with 24 kbits/s.

One of the advantages of this system is that, when transmitting in the SDH system, the channels are packed together with the other data, which means that the channels will be fed with certainty to the point where the VC-12 is unpacked, and this will usually also be the point where the information is to be used.

In summary, a method of transmitting, user-specified data signals in such a transmission network comprises transmitting the user-specified data signals in one or more of the bytes in the pulse frame which are not occupied by the introduction of the PDH signals into the SDH.

Although a preferred embodiment of the present invention has been described and illustrated, the invention is not restricted to this, but may be embodied in other ways within the scope of the subject matter defined in the following claims.

What is claimed is:

1. A data transmission system for the transmission of a large number of telephone channels between nodes in a transmission network designed as a Synchronous Digital Hierarchy (SDH), where a pulse frame contains a large number of bytes, each of which may be used for transmitting a telephone channel or overhead signals for administering the system, and where signals from a Plesiochronous Digital Hierarchy (PDH) are inserted into the pulse frame for the Synchronous Digital Hierarchy, so that the signals from the Plesiochronous Digital Hierarchy when inserted do not occupy all the bytes in said pulse frame, characterized in that at least some of the bytes in the pulse frame which are not occupied by said insertion are used for transmitting a user-specified data signal, wherein the bytes used for transmitting the user-specified data signal are bytes other than fixed stuff bytes and overhead bytes.

2. The data transmission system according to claim 1, where the signals from the Plesiochronous Digital Hierarchy comprise signals at 2 Mbits/s which are inserted into a virtual container VC-12 in the synchronous Digital Hierarchy, characterized in that the user-specified data signals are placed in one or more of the bytes which are fixed stuff bytes in this insertion in addition to the bytes other than fixed stuff bytes and overhead bytes.

3. A data transmission system for the transmission of a large number of telephone channels between nodes in a transmission network designed as a Synchronous Digital Hierarchy (SDH), where a pulse frame (e.g. STM-1) contains a large number of bytes, each of which may be used for transmitting a telephone channel or overhead signals for administering the system, and where signals from a Plesiochronous Digital Hierarchy (PDH) are inserted into the pulse frame for the Synchronous Digital Hierarchy, so that the signals from the Plesiochronous Digital Hierarchy when inserted do not occupy all the bytes in said pulse frame, characterized in that at least some of the bytes in the pulse frame which are not occupied by said insertion are used for transmitting user-specified data signal, where the signals from the Plesiochronous Digital Hierarchy comprise signals at 2 Mbits/s which are inserted into a virtual container VC-12 in the Synchronous Digital Hierarchy, characterized in that the bytes in which the user-specified data signals may be placed are byte No. 34 and byte No. 104 in the virtual container VC-12.

4. A data transmission system for the transmission of a large number of telephone channels between nodes in a transmission network designed as a Synchronous Digital Hierarchy (SDH), where a pulse frame (e.g. STM-1) contains a large number of bytes, each of which may be used for transmitting a telephone channel or overhead signals for administering the system, and where signals from a Plesiochronous Digital Hierarchy (PDH) are inserted into the pulse frame for the Synchronous Digital Hierarchy, so that the signals from the Plesiochronous Digital Hierarchy when inserted do not occupy all the bytes in said pulse frame, characterized in that at least some of the bytes in the pulse frame which are not occupied by said insertion are used for transmitting a user-specified data signal, characterized in that up to 7 user channels with 24 kbits/s may be transmitted in said bytes.

5. A method of transmitting user-specified data signals in a transmission network designed as a Synchronous Digital Hierarchy (SDH) where a pulse frame contains a large number of bytes, each of which may be used for transmitting a telephone channel or overhead signals for administering the system, and where signals from a Plesiochronous Digital Hierarchy (PDH) are inserted into the pulse frame for the Synchronous Digital Hierarchy so that the signals from the Plesiochronous Digital Hierarchy when inserted do not occupy all the bytes in said pulse frame, characterized in that the user-specified data signals are transmitted in one or more of the bytes in the pulse frame which are not occupied by said insertion, wherein the bytes used for transmitting user-specified data signals are bytes other than fixed stuff bytes and overhead bytes.

6. The method according to claim 5, where the signals from the Plesiochronous Digital Hierarchy comprise signals at 2 Mbits/s which are inserted into a virtual container VC12 in the Synchronous Digital Hierarchy, characterized in that the user-specified data signals are transmitted in one or more of the bytes which are fixed stuff bytes in this insertion in addition to the bytes other than fixed stuff bytes and overhead bytes.

7. A method of transmitting user-specified data signals in a transmission network designed as a Synchronous Digital Hierarchy (SDH) where a pulse frame (e.g. STM-1) contains a large number of bytes, each of which may be used for transmitting a telephone channel or overhead signals for administering the system, and where signals from a Plesiochronous Digital Hierarchy (PDH) are inserted into the pulse frame for the Synchronous Digital Hierarchy so that the signals from the Plesiochronous Digital Hierarchy when inserted do not occupy all the bytes in said pulse frame, characterized in that the user-specified data signals are transmitted in one or more of the bytes in the pulse frame which are not occupied by said insertion, where the signals from the Plesiochronous Digital Hierarchy comprise signals at 2 Mbits/s which are inserted into a virtual container VC12 in the Synchronous Digital Hierarchy, characterized in that the user-specified data signals are transmitted in byte No. 34 and/or byte No. 104 in the virtual container VC-12.

8. A method of transmitting user-specified data signals in a transmission network designed as a Synchronous Digital Hierarchy (SDH) where a pulse frame (e.g. STM-1) contains a large number of bytes, each of which may be used for transmitting a telephone channel or overhead signals for administering the system, and where signals from a Plesiochronous Digital Hierarchy (PDH) are inserted into the pulse frame for the Synchronous Digital Hierarchy so that the signals from the Plesiochronous Digital Hierarchy when inserted do not occupy all the bytes in said pulse frame, characterized in that the user-specified data signals are transmitted in one or more of the bytes in the pulse frame which are not occupied by said insertion, characterized in that the user-specified data signals are transmitted in up to 7 user channels with 24 kbits/s.

9. A data transmission system for the transmission of a large number of telephone channels between nodes in a transmission network designed as a Synchronous Digital Hierarchy (SDH), where a pulse frame (e.g. STM-1) contains a large number of bytes, each of which may be used for transmitting a telephone channel or overhead signals for administering the system, and where signals from a Plesiochronous Digital Hierarchy (PDH) are inserted into the pulse frame for the Synchronous Digital Hierarchy, so that the signals from the Plesiochronous Digital Hierarchy when inserted do not occupy all the bytes in said pulse frame, characterized in that at least some of the bytes in the pulse frame which are not occupied by said insertion are used for transmitting a user-specified data signal, where the signals from the Plesiochronous Digital Hierarchy comprise signals at 2 Mbits/s which are inserted into a virtual container VC-12 in the Synchronous Digital Hierarchy, characterized in that the user-specified data signal are placed in one or more of the bytes which are fixed stuff bytes in this insertion characterized in that the bytes in which the user-specified data signal may be placed are byte No. 34 and byte No. 104 in the virtual container VC-12 in addition to fixed stuff bytes.

10. A method of transmitting user-specified data signals in a transmission network designed as a Synchronous Digital Hierarchy (SDH) where a pulse frame (e.g. STM-1) contains a large number of bytes, each of which may be used for transmitting a telephone channel or overhead signals for administering the system, and where signals from a Plesiochronous Digital Hierarchy (PDH) are inserted into the pulse frame for the Synchronous Digital Hierarchy so that the signals from the Plesiochronous Digital Hierarchy when inserted do not occupy all the bytes in said pulse frame, characterized in that the user-specified data signals are transmitted in one or more of the bytes in the pulse frame which are not occupied by said insertion, where the signals from the Plesiochronous Digital Hierarchy comprise signals at 2 Mbits/s which are inserted into a virtual container VC12 in the Synchronous Digital Hierarchy, characterized in that the user-specified data signals are transmitted in one or more of the bytes which are called fixed stuff bytes in this insertion, characterized in that the user-specified data signals are transmitted in byte No. 34 and/or byte No. 104 in the virtual container VC-12 in addition to fixed stuff bytes.

* * * * *